(12) United States Patent
Zhou

(10) Patent No.: US 10,531,534 B1
(45) Date of Patent: Jan. 7, 2020

(54) SWITCHED-MODE CONTROL CIRCUIT FOR CORRELATED COLOR TEMPERATURE BASED ON LINEAR DRIVE LED LIGHTING

(71) Applicant: Wuxi ORG Microelectronics Co., Ltd, Wuxi, Jiangsu (CN)

(72) Inventor: Zhicheng Zhou, Jiangsu (CN)

(73) Assignee: Wuxi ORG Microelectronics Co., Ltd., Wuxi (CN)

( * ) Notice: Subject to any disclaimer, the term of this patent is extended or adjusted under 35 U.S.C. 154(b) by 0 days.

(21) Appl. No.: 16/374,727

(22) Filed: Apr. 3, 2019

(30) Foreign Application Priority Data

Jan. 29, 2019 (CN) .......................... 2019 1 0085396

(51) Int. Cl.
*H05B 37/02* (2006.01)
*H05B 33/08* (2006.01)

(52) U.S. Cl.
CPC ..... *H05B 33/0857* (2013.01); *H05B 33/0812* (2013.01); *H05B 33/0815* (2013.01); *H05B 33/0827* (2013.01); *H05B 33/0845* (2013.01)

(58) Field of Classification Search
CPC .......................... H05B 33/0045; H05B 33/0827
USPC .......................... 315/185 R, 209 R, 210, 291
See application file for complete search history.

(56) References Cited

U.S. PATENT DOCUMENTS 9,730,291 B1 * 8/2017 Janik ..................... H05B 33/086
2013/0069561 A1 * 3/2013 Melanson .......... H05B 33/0815
315/297

* cited by examiner

*Primary Examiner* — Thuy V Tran
(74) *Attorney, Agent, or Firm* — Wayne & Ken, LLC; Tony Hom

(57) ABSTRACT

A switched-mode control circuit for correlated color temperature (CCT) based on linear drive LED lighting, including a switched-mode CCT control module, a linear drive control module, and an LED lighting module which is connected with the switched-mode CCT control module and the linear drive module. The switched-mode CCT control module is used to control and adjust the CCT of the LED lighting module, so that the LED lighting module emits light with different CCTs, and it may or may not have a memory function. The linear drive control module is capable of controlling and adjusting illuminance of the LED lighting module. The control circuit has a simple design and enables the adjustment of both the CCT and the illuminance, promoting the user experience.

8 Claims, 5 Drawing Sheets

SWITCHED-MODE CONTROL CIRCUIT FOR CORRELATED COLOR TEMPERATURE BASED ON LINEAR DRIVE LED LIGHTING

CROSS-REFERENCE TO RELATED APPLICATIONS

This application claims the benefit of priority from Chinese Patent Application No. CN201910085396.7, filed on Jan. 29, 2019. The content of the aforementioned application, including any intervening amendments thereto, is incorporated herein by reference in its entirety.

TECHNICAL FIELD

The present invention relates to a switched-mode control circuit for correlated color temperature (CCT) based on linear drive LED lighting.

BACKGROUND OF THE INVENTION

A linear drive circuit for LED lighting is simple in structure, and works at power frequency without high frequency interference, which is favored by consumers.

In recent years, LEDs have been widely used as a lighting source, and a new trend is to develop LEDs capable of adjusting both illuminance and CCT as the requirements for LEDs increase and the LED technology develops. In the existing linear drive LED lighting, the drive circuit is unable to achieve the adjustment of both the illuminance and the CCT. However, in this application, the linear drive circuit and the CCT adjustment circuit are compatible in a control circuit, so that the illuminance can also be adjusted at the same time. The CCT is adjusted by a switch, which may or may not involve a memory function. Therefore, the present invention is significantly different from the existing circuits.

SUMMARY OF THE INVENTION

At present, there are few switched-mode control circuits for correlated color temperature based on linear drive LED lighting, and less switched-mode control circuits for correlated color temperature capable of adjusting both illuminance and CCT, and particularly, there is even no such circuit having a memory function. The present invention aims to solve the above problem to meet the market requirement. Therefore, the present invention provides a switched-mode control circuit for correlated color temperature based on linear drive LED lighting, including a switched-mode CCT control module, a linear drive control module and an LED lighting module connected with the switched-mode CCT control module and the linear drive control module. The switched-mode CCT control module is used to control and adjust the CCT of the LED lighting module, so that the LED lighting module emits light with different CCTs and it may or may not have a memory function. The linear drive control module is capable of controlling and adjusting illuminance of the LED lighting module. The control circuit has a simple design and enables the adjustment of both the CCT and the illuminance, promoting the user experience.

The switched-mode control circuit for correlated color temperature based on linear drive LED lighting according to the present invention includes an AC power supply module, a switched-mode CCT control module, an LED lighting module and a linear drive control module. The LED lighting module is connected to the AC power supply module. The LED lighting module includes at least two groups of LEDs arranged in parallel each having different CCTs. The switched-mode CCT control module is arranged between the AC power supply module and the LED lighting module, and is configured to control turn-on of at least one group of LEDs and adjust a mixed CCT of the LED lighting module, so that the LED lighting module emits light with different CCTs. In addition, a memory function may or may not be included. The linear drive control module is arranged behind the AC power supply module and the switched-mode CCT control module, and is configured to control and adjust illuminance of the LED lighting module.

The control circuit is simple in structure, and enables the adjustment of both the CCT and the illuminance, promoting the user experience.

The switched-mode control circuit for correlated color temperature based on linear drive LED lighting has the following additional features.

In an embodiment, the LED lighting module includes a first group of LEDs and a second group of LEDs arranged in parallel.

A switched-mode CCT adjustment module is arranged between the first group of LEDs and the second group of LEDs, and is configured to adjust the CCT of at least one of the first group of LEDs and the second group of LEDs.

In an embodiment, the LED lighting module includes a first group of LEDs and a second group of LEDs arranged in parallel.

The switched-mode CCT adjustment module is arranged between the first group of LEDs and the second group of LEDs, and is configured to adjust the CCT of at least one of the first group of LEDs and the second group of LEDs or a mixed CCT of the first group of LEDs and the second group of LEDs.

In an embodiment, the switched-mode CCT adjustment module includes a first resistor unit, a first diode, a second diode and a second resistor unit. The first resistor unit includes a plurality of resistors arranged in parallel. The second resistor unit includes a plurality of resistors arranged in parallel. The first resistor unit is connected to an anode of the first diode. A cathode of the first diode is connected to a cathode of the second diode. The control circuit adjusts and mixes two CCTs to emit a mixed CCT.

In an embodiment, the LED lighting module includes at least three LED strings with different CCTs which are arranged in parallel.

An AC rectifier module is provided between the AC power supply module and the LED lighting module.

The AC rectifier module includes a first filter resistor, a bridge rectifier and a third diode which are sequentially connected to a live line, and a second filter resistor connected to a neutral line. A first node is arranged between the live line and the first filter resistor. A second node is arranged between the neutral line and the second filter resistor. A varistor is arranged between the first node and the second node. A third node is arranged between the first filter resistor and the bridge rectifier. A capacitor is arranged between the third node and the second filter resistor. The bridge rectifier is connected to an anode of the third diode, and the bridge rectifier is grounded.

A sense resistor is arranged between the AC power supply module and the switched-mode CCT control module.

A dropping resistor and an RC divider circuit arranged in series are arranged between the AC power supply module and the linear drive control module, and the RC divider circuit is grounded.

The linear drive control module includes a control IC and an MOS transistor connected to the control IC. A gate electrode of the MOS transistor is connected to the linear drive control module. A drain electrode of the MOS transistor is connected to the switched-mode CCT control module. A third resistor unit is arranged between a source electrode of the MOS transistor and the linear drive control module. The third resistor unit includes two resistors arranged in parallel, and the third resistor unit is grounded.

The additional aspects and advantages of the invention will be given in the following description, from which the advantages of the present invention become more apparent.

BRIEF DESCRIPTION OF THE DRAWINGS

The present invention will be further described below with reference to the accompanying drawings, from which the above and additional aspects and advantages of the present invention become more apparent and understandable.

DETAILED DESCRIPTION OF EMBODIMENTS

Figure 1:
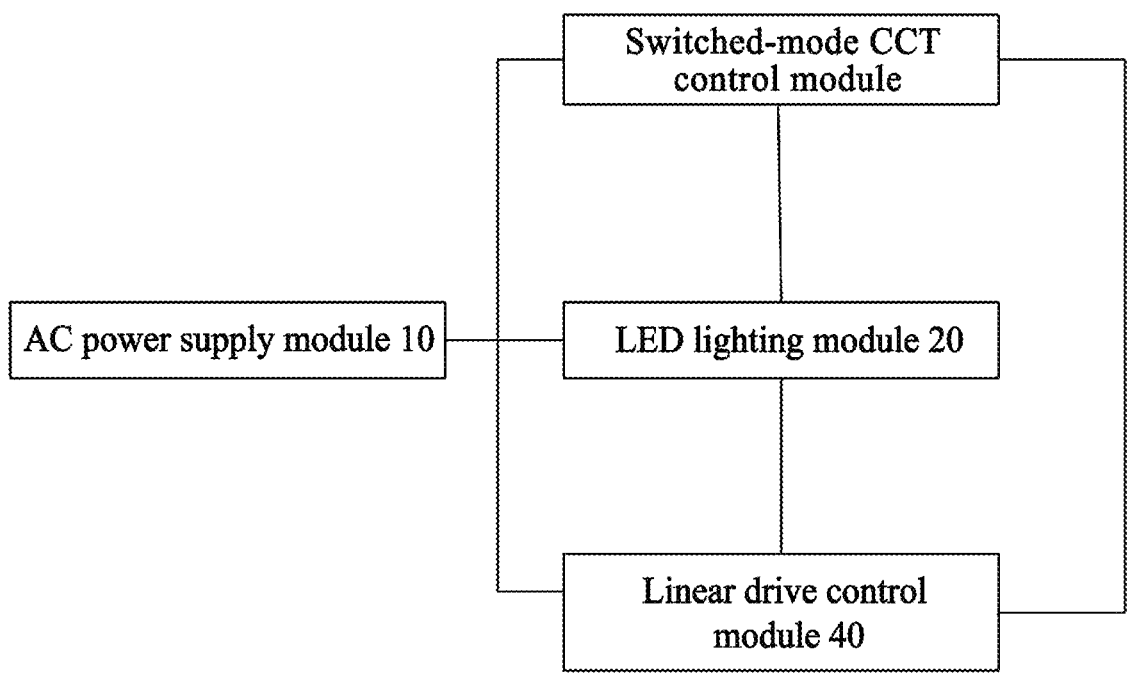
FIG. 1 is a block diagram of a switched-mode control circuit for correlated color temperature based on linear drive LED lighting according to an embodiment of the present invention.

The embodiments of the present invention are described in detail below with reference to the accompanying drawings. The same or like reference numerals always refer to the same or like elements or elements having the same or like functions. The embodiments are intended to illustrate the invention, but not to limit the scope of the present invention.

As shown in FIGS. 1-5, the present invention provides a switched-mode control circuit for correlated color temperature based on linear drive LED lighting. A switched-mode control circuit for correlated color temperature is applied to the linear drive LED lighting, such that the adjustment of both the CCT and the illuminance of the LED lighting module is achieved.

The switched-mode control circuit for correlated color temperature based on linear drive LED lighting includes an AC power supply module 10, an LED lighting module 20, a switched-mode CCT control module 30 and a linear drive control module 40. The LED lighting module 20 includes a high CCT LED string and a low CCT LED string.

The AC power supply module 10 is configured to provide an AC power source for the circuit. In an embodiment, the power supply module 10 provides the AC power source of 120 V or 220 V in voltage. The AC power supply module 10 has two voltage inputs, i.e., a live terminal (marked as L) and a neutral terminal (marked as N).

The LED lighting module 20 (including high and low CCT LED strings) is connected to the AC power supply module 10, and receives the voltage input from the AC power supply module 10 to power the LED under the control of a switch, so that the LED emits a CCT. The LED lighting module 20 includes at least two group of LEDs arranged in parallel, namely, the LED lighting module 20 includes two groups of LEDs or more groups of LEDs which are arranged in parallel and emit different CCTs. In this embodiment, each group of LEDs in the LED lighting module 20 comprises a CCT that is different from one another; that is, the CCTs of different groups of LEDs arranged in parallel are different from one another.

The switched-mode CCT control module 30 is connected to the AC power supply module 10 and the LED lighting module 20 for controlling turn-on of at least one group of LEDs, i.e., for control of all LEDs included in the LED lighting module 20 and control of the turn-on or turn-off of at least one group of LEDs. Due to different CCTs of each group of LEDs, when the switched-mode CCT control module 30 controls the turn-on or turn-off of each group of LEDs of the LED lighting module 20, the LED lighting module 20 emits different CCTs, and may or may not have a memory function.

Specifically, the LED lighting module 20 is controlled by the switched-mode CCT control module 30 to emit different CCTs, which is realized by controlling on and off of the switch. The on and off of the switch and a time gap between on and off can trigger an enable signal of the switched-mode CCT control module 30. When the switched-mode CCT control module 30 receives the enable signal, the LED lighting module emits different CCTs. In addition, the memory function may or may not be enabled according to the enable signal. For example, in a cloudy or a dim condition, the LED lighting module 20 is controlled by the switched-mode CCT control module to emit light with a higher CCT, so that the user can have a clear sight. At night, the LED lighting module 20 is controlled by the switch to emit light with a lower CCT, so that human eyes will not be irritated by the strong light. In addition, the user can observe that the LED lighting module 20 emits light of different CCTs, leading to simple operation and visual aesthetics and thereby promoting the user experience.

The linear drive control module 40 is connected to the AC power supply module 10 and the LED lighting module 20 for controlling and adjusting the illuminance of the LED lighting module 20. That is, the linear drive control module 40 is configured to adjust the illuminance of the LED lighting module 20, so that the LED lighting module can emit light with different illuminance.

The control circuit of the present invention can not only minimize the number of the peripheral components to simplify circuit, but also enables the logic consistency when multiple power sources are applied. When used in combination with a linear high-voltage constant current drive module, the present circuit may or may not adjust the illuminance while adjusting the CCT, which greatly improves the practicality and the user experience.

In some implementations, the LED lighting module 20 includes a plurality of groups of LEDs arranged in parallel, i.e., two, three or more groups of LEDs. In an embodiment, the LED lighting module 20 includes a high CCT LED string, a mixed CCT LED string and a high CCT LED string.

Figure 3:
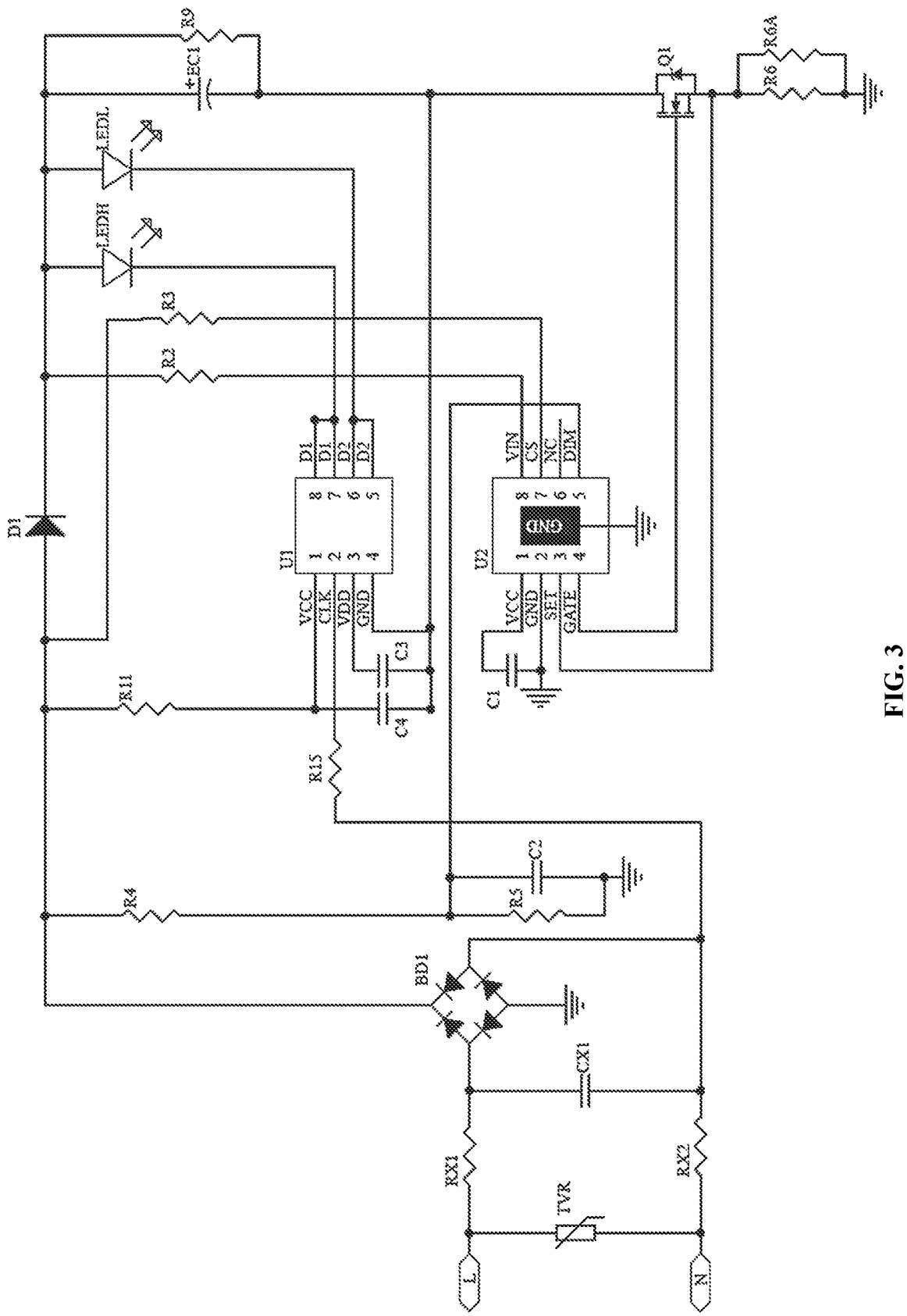
FIG. 3 is a circuit diagram of the switched-mode control circuit for correlated color temperature based on linear drive LED lighting according to an embodiment of the present invention.

In an embodiment, as shown in FIG. 3, the LED lighting module 20 includes two groups of LEDs arranged in parallel, i.e., the first group of LEDs 50 and the second group of LEDs 60. The first group of LEDs 50 and the second group of LEDs 60 are arranged in parallel. Under the control of the switched-mode CCT control module 30 and the linear drive control module 40, the LED lighting module 20 emits light with two CCTs and different illuminance or three CCTs and different illuminance.

In an embodiment, the LED lighting module 20 includes three groups of LEDs arranged in parallel. Under the control of the switched-mode CCT control module 30 and the linear drive control module 40, the LED lighting module 20 emits light with three CCTs and different illuminance.

Figure 5:
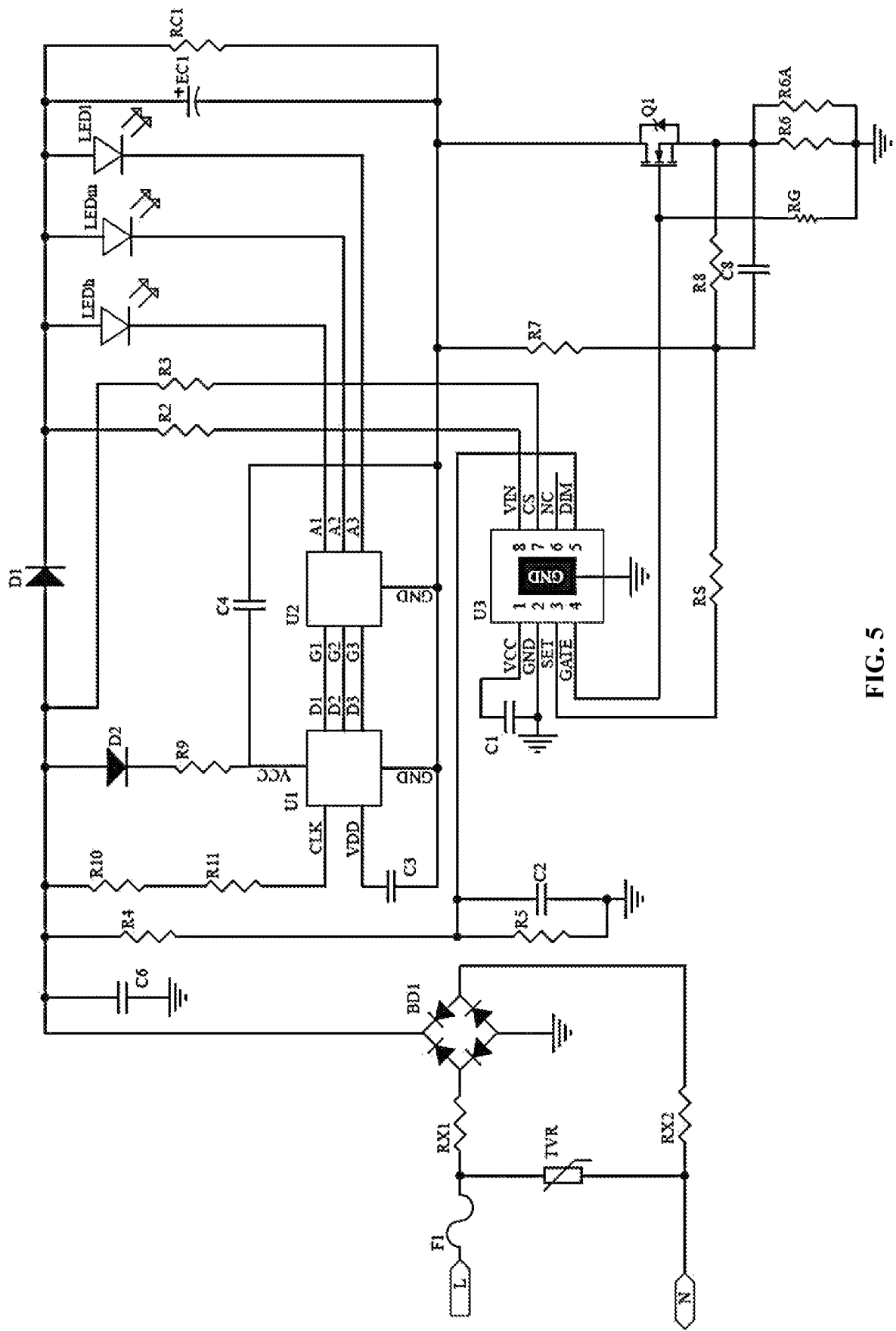
FIG. 5 is a circuit diagram of the switched-mode control circuit for correlated color temperature based on linear drive LED lighting according to yet another embodiment of the present invention.

In an embodiment, as shown in FIG. 5, the LED lighting module 20 include three groups of LEDs arranged in parallel, i.e., a first group of LEDs 50 (marked as LEDH), a second group of LEDs 60 (marked as LEDL) and a third group of LEDs 90 (marked as LEDM), and correspondingly the illumination of the high CCT LED string, the mixed CCT LED string and the low CCT LED string can be achieved. Under the control of the switched-mode CCT control module 30 and the linear drive control module 40, the LED lighting module 20 (including the high CCT LED string, the mixed CCT LED string and the low CCT LED string) emits light with three CCTs and different illuminance.

Figure 4:
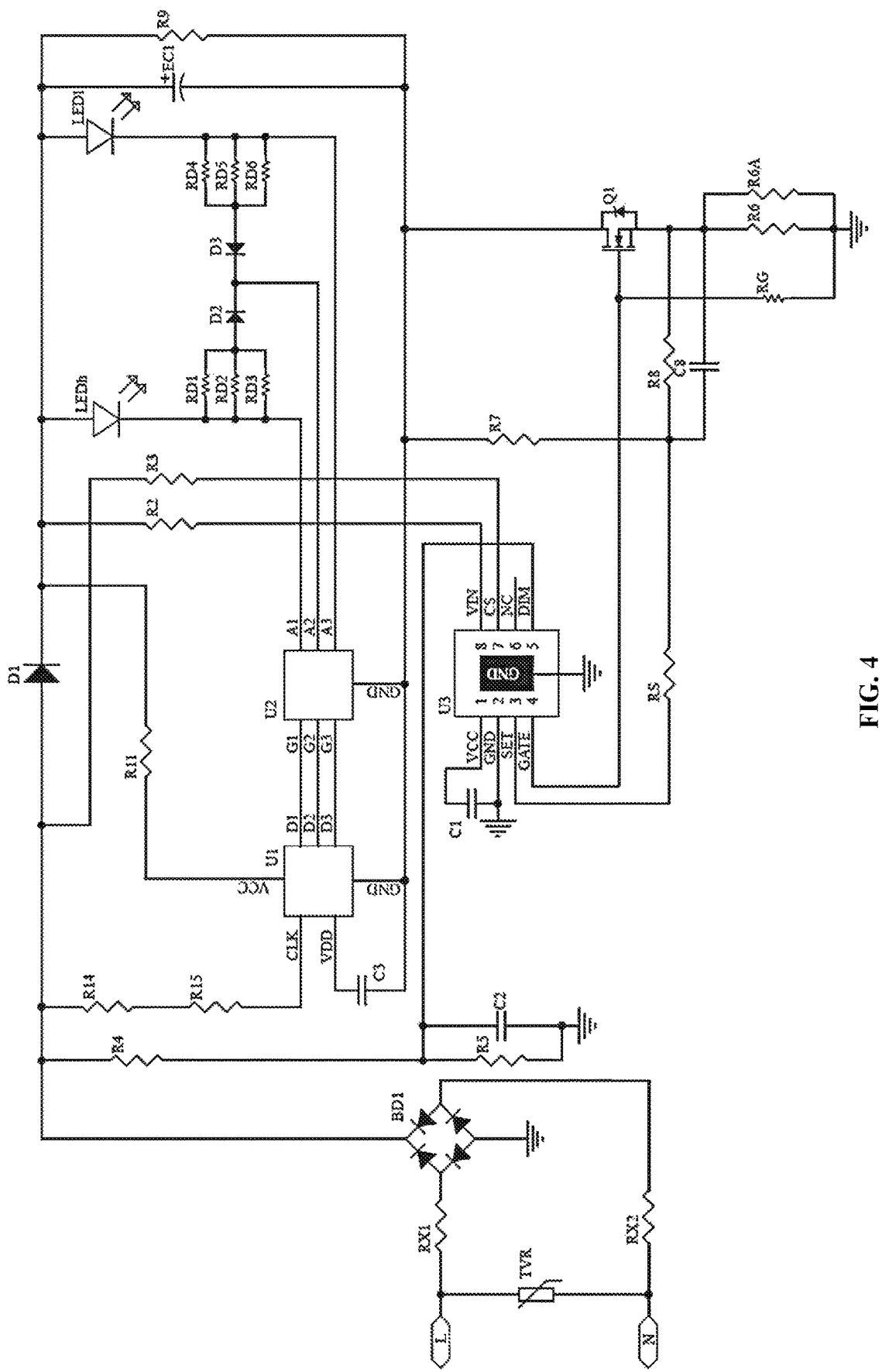
FIG. 4 is a circuit diagram of the switched-mode control circuit for correlated color temperature based on linear drive LED lighting according to another embodiment of the present invention.

In an embodiment, the control circuit of the present invention can realize at least three CCTs and different illuminance through two groups of LEDs. Specifically, as shown in FIG. 4, the switched-mode CCT adjustment module 70 is arranged between the first group of LEDs 50 and the second group of LEDs 60, and is configured to adjust the CCT of between the first group of LEDs 50 and the CCT of the second group of LEDs 60. The LED lighting module 20 includes the high CCT LED string, the mixed CCT LED string and the low CCT LED string. In the control circuit of the present invention, two groups of LEDs emit light with three CCTs and different illuminance by the arrangement of switched-mode CCT adjustment module 70, thus reducing the number of LEDs and cost to use and achieving energy savings.

In an embodiment, as shown in FIG. 4, the CCT adjustment module 70 includes a first resistor unit, a first diode D2, a second diode D3 and a second resistor unit which are arranged in parallel. The first resistor unit includes a plurality of resistors arranged in parallel, which are marked as RD1, RD2, and so on. The second resistor unit includes a plurality of resistors arranged in parallel, which are marked as RP1, RP2 and so on. The first resistor unit is connected to the anode of the first diode D2. The cathode of the first diode D2 is connected to the cathode of the second diode D3. The anode of the second diode D3 is connected to the second resistor unit.

Figure 2:
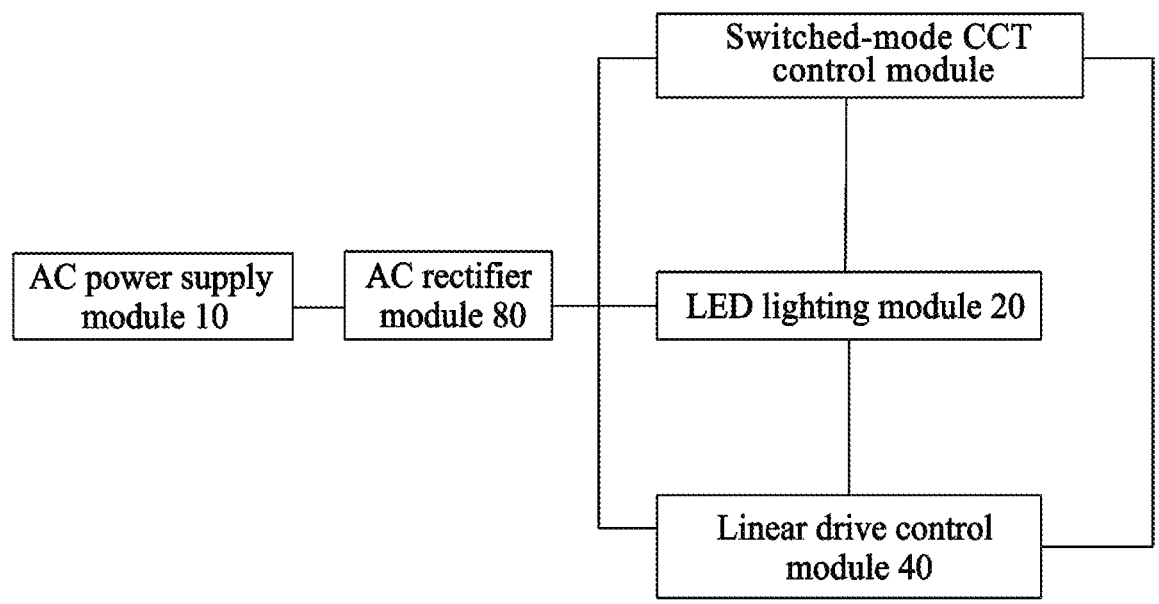
FIG. 2 is a block diagram of a switched-mode control circuit for correlated color temperature based on linear drive LED lighting according to another embodiment of the present invention.

In an embodiment, as shown in FIG. 2, an AC rectifier module 80 is arranged between the AC power supply module 10 and the LED lighting module 20. The AC rectifier module 80 is configured to process the voltage received from the AC power supply module 10, such as noise reduction, filtering and rectification, so as to meet the subsequent requirement for the circuit and promote the stability and safety of the circuit.

In an embodiment, as shown in FIG. 3, the AC rectifier module 80 includes a first filter resistor RX1, a bridge rectifier BD1 and a third diode D1 which are sequentially connected with a live line L, and a second filter resistor RX2 connected to the neutral line N. A first node is arranged between the live line L and the first filter resistor RX1. A second node is arranged between the neutral line N and the second filter resistor RX2. A varistor TVR is arranged between the first node and the second node. A third node is arranged between the first filter resistor RX1 and the bridge rectifier BD1. A capacitor CX1 is arranged between the third node and the second filter resistor RX2. The bridge rectifier BD1 is connected to an anode of the third diode, and the cathode of the third diode D1 is connected to the LED lighting module. The bridge rectifier is grounded.

In an embodiment, a sense resistor is arranged between the AC power supply module 10 and the switched-mode CCT control module 30, thereby switching the CCTs of the switched-mode CCT control module 30.

In an embodiment, a dropping resistor and an RC divider circuit arranged in series are provided between the AC power supply module 10 and the linear drive control module 40, and the RC divider circuit is grounded. Specifically, as shown in FIG. 3, the dropping resistor and the RC divider circuit are arranged between the AC power supply module 10 and the linear drive control module 40, and the dropping resistor R4 and the RC divider circuit are arranged in series. The dropping resistor R4 is connected to the bridge rectifier BD1 of the AC power supply module 10. The RC divider circuit includes a resistor R5 and a capacitor C2, and the RC divider circuit is grounded. The dropping resistor R4 and the RC divider circuit arranged in series are arranged between the AC power supply module 10 and the linear drive control module 40, which stabilizes the input voltage of the linear drive control module 40, promoting the stability and safety of the circuit.

In an embodiment, the linear drive control module 40 includes a control IC and an MOS transistor connected to the control IC. A gate electrode of the MOS transistor is connected to the linear drive control module. A drain electrode of the MOS transistor is connected to the switched-mode CCT control module. A third resistor unit is arranged between the source electrode of the MOS transistor and the linear drive control module. The third resistor unit includes two resistors arranged in parallel, and the third resistor unit is grounded. Specifically, as shown in FIG. 3, the gate electrode of the MOS transistor Q1 is connected to the linear drive control module 40. The drain electrode of the MOS transistor Q1 is connected to the switched-mode CCT control module 30. The third resistor unit is arranged between a source electrode of the MOS transistor Q1 and the linear drive control module. The third resistor unit includes two resistors arranged in parallel, i.e., R6 and R6A, and the third resistor unit is grounded.

Principle for adjustment of CCT and illuminance is illustrated with reference to an example. As shown in FIG. 3, a CLK pin of the switched-mode CCT control module 30 (i.e., U1) is connected to the neutral line N of the AC power supply module 10. The zero-crossing detection method is used to determine whether the power is off and to measure the off time, and color change of CCT channel is further controlled by turning off the power (e.g., controlling pin interfaces 7 and 8 of the LEDH or pin interfaces 5 and 6 of the LEDL). As a result, the turn-on of the LEDH or LEDL can be achieved to adjust the two CCTs and to monitor the states of the LEDs. The linear drive control module 40 (i.e., U2 and MOS transistor Q1) is configured to provide for the control of constant current and adjustment of illuminance or no adjustment of illuminance.

In the description of the present invention, "an embodiment", "embodiments", "an example", or "examples" means that the particular features, structures, materials or characteristics described with reference to the embodiment(s) or example(s) is contained in at least one embodiment or example of the present invention. The illustrative expression of the above terms does not necessarily mean the same embodiment. Moreover, the particular features, structures, materials, or characteristics described may be combined in a suitable manner in any one or more embodiments or examples.

It should be understood that above embodiments are illustrative, are not intended to limit the scope of the present invention. Variations, modifications, substitutions and variations of the above embodiments may be made by those skilled in the art without departing from the scope of the invention.

What is claimed is:

1. A switched-mode control circuit for correlated color temperature (CCT) based on linear drive LED lighting, comprising:
    an AC power supply module;
    an LED lighting module;
    a switched-mode CCT control module; and
    a linear drive control module;
    wherein the LED lighting module is connected to the AC power supply module, and comprises at least two groups of LEDs arranged in parallel each having different correlated color temperatures;
    the switched-mode CCT control module is arranged between the AC power supply module and the LED lighting module, and is configured to control turn-on of at least one of the at least two group of LEDs to control the correlated color temperatures of the at least two groups of LEDs; and
    the linear drive control module is arranged between the AC power supply module and the LED lighting module, and is configured to control and adjust illuminance of the at least two groups of LEDs in the LED lighting module; and
    wherein the at least two groups of LEDs comprises a first group of LEDs and a second group of LEDs arranged in parallel; a CCT adjustment module is arranged between the first group of LEDs and the second group of LEDs, and is configured to adjust the correlated color temperature of at least one of the first group of LEDs and the second group of LEDs or a mixed correlated color temperature of the first group of LEDs and the second group of LEDs; and the switched-mode CCT control module comprises a first resistor unit, a first diode, a second diode and a second resistor unit arranged in series; the first resistor unit comprises a plurality of resistors arranged in parallel; the second resistor unit comprises a plurality of resistors arranged in parallel; the first resistor unit is connected with an anode of the first diode; and a cathode of the first diode is connected to a cathode of the second diode.

2. The switched-mode control circuit of claim 1, wherein the at least two groups of LEDs comprises at least three LED strings with different correlated color temperatures which are arranged in parallel.

3. The switched-mode control circuit of claim 1, wherein an AC rectifier module is arranged between the AC power supply module and the LED lighting module; the AC rectifier module comprises a first filter resistor, a bridge rectifier, a third diode which are sequentially connected with a live line, and a second filter resistor connected to a neutral line;
    wherein a first node is arranged between the live line and the first filter resistor; a second node is arranged between the neutral line and the second filter resistor; a varistor is arranged between the first node and the second node; a third node is arranged between the first filter resistor and the bridge rectifier; a capacitor is arranged between the third node and the second filter resistor; the bridge rectifier is connected to an anode of the third diode; and the bridge rectifier is grounded.

4. The switched-mode control circuit of claim 3, wherein a sense resistor is arranged between the AC power supply module and the switched-mode CCT control module.

5. The switched-mode control circuit of claim 4, wherein a dropping resistor and an RC divider circuit arranged in series are provided between the AC power supply module and the linear drive control module, and the RC divider circuit is grounded.

6. The switched-mode control circuit claim 5, wherein the linear drive control module comprises a control IC, and an MOS transistor connected to the control IC; a gate electrode of the MOS transistor is connected to the linear drive control module; a drain electrode of the MOS transistor is connected to the switched-mode CCT control module; a third resistor unit is arranged between a source electrode of the MOS transistor and the linear drive control module; the third resistor unit comprises two resistors arranged in parallel; and the third resistor unit is grounded.

7. The switched-mode control circuit of claim 4, wherein the linear drive control module comprises a control IC, and an MOS transistor connected to the control IC; a gate electrode of the MOS transistor is connected to the linear drive control module; a drain electrode of the MOS transistor is connected to the switched-mode CCT control module; a third resistor unit is arranged between a source electrode of the MOS transistor and the linear drive control module; the third resistor unit comprises two resistors arranged in parallel; and the third resistor unit is grounded.

8. The switched-mode control circuit of claim 3, wherein the linear drive control module comprises a control IC, and an MOS transistor connected to the control IC; a gate electrode of the MOS transistor is connected to the linear drive control module; a drain electrode of the MOS transistor is connected to the switched-mode CCT control module; a third resistor unit is arranged between a source electrode of the MOS transistor and the linear drive control module; the third resistor unit comprises two resistors arranged in parallel; and the third resistor unit is grounded.

* * * * *